(12) United States Patent
Onomura

(10) Patent No.: US 10,681,279 B2
(45) Date of Patent: Jun. 9, 2020

(54) IMAGE PICKUP APPARATUS, NON-TRANSITORY COMPUTER-READABLE RECORDING MEDIUM STORING COMPUTER PROGRAM, AND IMAGE PICKUP METHOD

(71) Applicant: Olympus Corporation, Hachioji-shi, Tokyo (JP)

(72) Inventor: Kenichi Onomura, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/355,433

(22) Filed: Mar. 15, 2019

(65) Prior Publication Data
US 2019/0327419 A1 Oct. 24, 2019

(30) Foreign Application Priority Data

Apr. 19, 2018 (JP) ................................ 2018-080721

(51) Int. Cl.
*H04N 5/232* (2006.01)

(52) U.S. Cl.
CPC .............................. *H04N 5/23287* (2013.01)

(58) Field of Classification Search
CPC ............... H04N 5/23287; H04N 5/349; H04N 5/23232; H04N 5/2259; H04N 7/17309; H04N 7/173; H04N 21/23805; H04N 21/6125; H04N 21/64307; H04N 21/64322
USPC ..................................................... 348/208.7
See application file for complete search history.

(56) References Cited

U.S. PATENT DOCUMENTS

| | | | |
|---|---|---|---|
| 5,889,553 A | 3/1999 | Kino et al. | |
| 6,211,910 B1 | 4/2001 | Kino et al. | |
| 10,038,849 B2 * | 7/2018 | Sakurai | H04N 5/2327 |
| 10,084,957 B2 * | 9/2018 | Tsuchiya | H04N 5/23287 |
| 2014/0125828 A1 * | 5/2014 | Takeuchi | H04N 5/2254 |
| | | | 348/208.99 |
| 2017/0064201 A1 * | 3/2017 | Tsuchiya | H04N 5/23229 |
| 2017/0208264 A1 * | 7/2017 | Ajito | H04N 5/349 |
| 2017/0223250 A1 * | 8/2017 | Ajito | H04N 5/23212 |
| 2017/0272655 A1 * | 9/2017 | Sakurai | H04N 5/23209 |
| 2018/0167569 A1 * | 6/2018 | Ajito | H04N 5/232 |
| 2018/0227494 A1 * | 8/2018 | Kim | H04N 5/2353 |
| 2018/0295286 A1 * | 10/2018 | Maede | H04N 5/23261 |

FOREIGN PATENT DOCUMENTS

JP 07-287268 10/1995

* cited by examiner

*Primary Examiner* — Pritham D Prabhakher
(74) *Attorney, Agent, or Firm* — John C. Pokotylo; Pokotylo Patent Services

(57) ABSTRACT

An image pickup apparatus includes: a lens and an image pickup sensor; an image stabilization circuit configured to relatively shift an object image and the image pickup sensor within a predetermined movable range; an image stabilization driver configured to control the image stabilization circuit to perform image stabilization and pixel shifting, and adjust pixel shifting based on a pixel shift adjustment amount corresponding to a control state of the image stabilization circuit; and a microcomputer configured to cause the image pickup sensor to continuously pick up a plurality of images while causing the image stabilization driver to perform image stabilization in an exposure period and perform adjusted pixel shifting in a non-exposure period.

18 Claims, 6 Drawing Sheets

IMAGE PICKUP APPARATUS, NON-TRANSITORY COMPUTER-READABLE RECORDING MEDIUM STORING COMPUTER PROGRAM, AND IMAGE PICKUP METHOD

CROSS REFERENCE TO RELATED APPLICATION

This application claims benefit of Japanese Application No. 2018-080721 filed in Japan on Apr. 19, 2018, the entire contents of which are incorporated herein by this reference.

BACKGROUND OF THE INVENTION

1. Field of the Invention

The present invention relates to an image pickup apparatus, a non-transitory computer-readable recording medium storing a computer program, and an image pickup method for performing image stabilization and pixel shifting.

2. Description of the Related Art

In an image pickup apparatus such as a digital camera and a digital video camera, an image stabilization technique for correcting a blur in handheld photographing has conventionally been known. Image stabilization is performed by, for example, shifting an image pickup device or moving at least part of a taking lens to shift a relative position between the image pickup device and an object image.

Pixel shift super resolution photographing has also conventionally been known in which pixel shifting is performed by, for example, half pixel pitches each time to acquire a plurality of images, and one high-resolution image is composed from the acquired plurality of images.

A technique has been proposed for performing pixel shifting together with image stabilization in an image pickup apparatus provided with an image stabilization apparatus.

For example, Japanese Patent Application Laid-Open Publication No. H07-287268 (U.S. Pat. Nos. 5,889,553, 6,211,910) discloses an image pickup device provided with: shake detecting means detecting the shake of the device; an imaging device; a luminous flux deflecting means arranged ahead of the imaging device on an optical path and moving in the optical path so that a passing luminous flux may be deflected; and a control means driving the luminous flux deflecting means, wherein the control means performs control in accordance with an aimed position signal and output signals from the detecting means. Here, the aimed position signal is a signal for moving a subject image formed on the imaging device by a specified amount related to the picture element pitch of the imaging device. It is said that a high-quality image can thus be obtained by performing both the image stabilization and the shift of a picture element without making the device large or the cost of the device high.

SUMMARY OF THE INVENTION

An image pickup apparatus according to an aspect of the present invention includes: an image pickup sensor including a plurality of pixels two-dimensionally arrayed at a predetermined pixel pitch, and configured to expose an object image using the plurality of pixels to generate an electrical image; a lens configured to form the object image on the image pickup sensor; an image stabilization circuit configured to relatively shift positions of the object image and the image pickup sensor in a direction perpendicular to an optical axis of the lens within a predetermined movable range; an image stabilization control circuit configured to control the image stabilization circuit to perform image stabilization for reducing movement of the object image formed on the image pickup sensor, and perform pixel shifting for generating a high-resolution image; a pixel shift adjustment circuit configured to set a pixel shift adjustment amount according to a control state of the image stabilization circuit, and adjust the pixel shifting based on the pixel shift adjustment amount; and an image pickup control circuit configured to cause the image pickup sensor to continuously pick up a plurality of images while causing the image stabilization control circuit to control the image stabilization circuit to perform the image stabilization in an exposure period and perform the pixel shifting adjusted by the pixel shift adjustment circuit in a non-exposure period.

In a non-transitory computer-readable recording medium storing a computer program according to another aspect of the present invention, the computer program is a program for causing the computer to execute: an image pickup for exposing an object image formed by a lens using a plurality of pixels of an image pickup sensor including the plurality of pixels two-dimensionally arrayed at a predetermined pixel pitch to generate an electrical image; an image stabilization for relatively shifting positions of the object image and the image pickup sensor in a direction perpendicular to an optical axis of the lens within a predetermined movable range; an image stabilization control for performing image stabilization for reducing movement of the object image formed on the image pickup sensor, and performing pixel shifting for generating a high-resolution image; a pixel shift adjustment for setting a pixel shift adjustment amount according to a control state of the image stabilization, and adjusting the pixel shifting based on the pixel shift adjustment amount; and an image pickup control for causing the image pickup sensor to continuously pick up a plurality of images while performing the image stabilization in an exposure period and performing the pixel shifting adjusted by the pixel shift adjustment in a non-exposure period, by the image stabilization control.

An image pickup method according to yet another aspect of the present invention includes: an image pickup for exposing an object image formed by a lens using a plurality of pixels of an image pickup sensor including the plurality of pixels two-dimensionally arrayed at a predetermined pixel pitch to generate an electrical image; an image stabilization for relatively shifting positions of the object image and the image pickup sensor in a direction perpendicular to an optical axis of the lens within a predetermined movable range; an image stabilization control for performing image stabilization for reducing movement of the object image formed on the image pickup sensor, and performing pixel shifting for generating a high-resolution image; a pixel shift adjustment for setting a pixel shift adjustment amount according to a control state of the image stabilization, and adjusting the pixel shifting based on the pixel shift adjustment amount; and an image pickup control for causing the image pickup sensor to continuously pick up a plurality of images while performing the image stabilization in an exposure period and performing the pixel shifting adjusted by the pixel shift adjustment in a non-exposure period, by the image stabilization control.

DETAILED DESCRIPTION OF THE PREFERRED EMBODIMENTS

Embodiments of the present invention will be described below with reference to the drawings.

Embodiment 1

Figure 1:
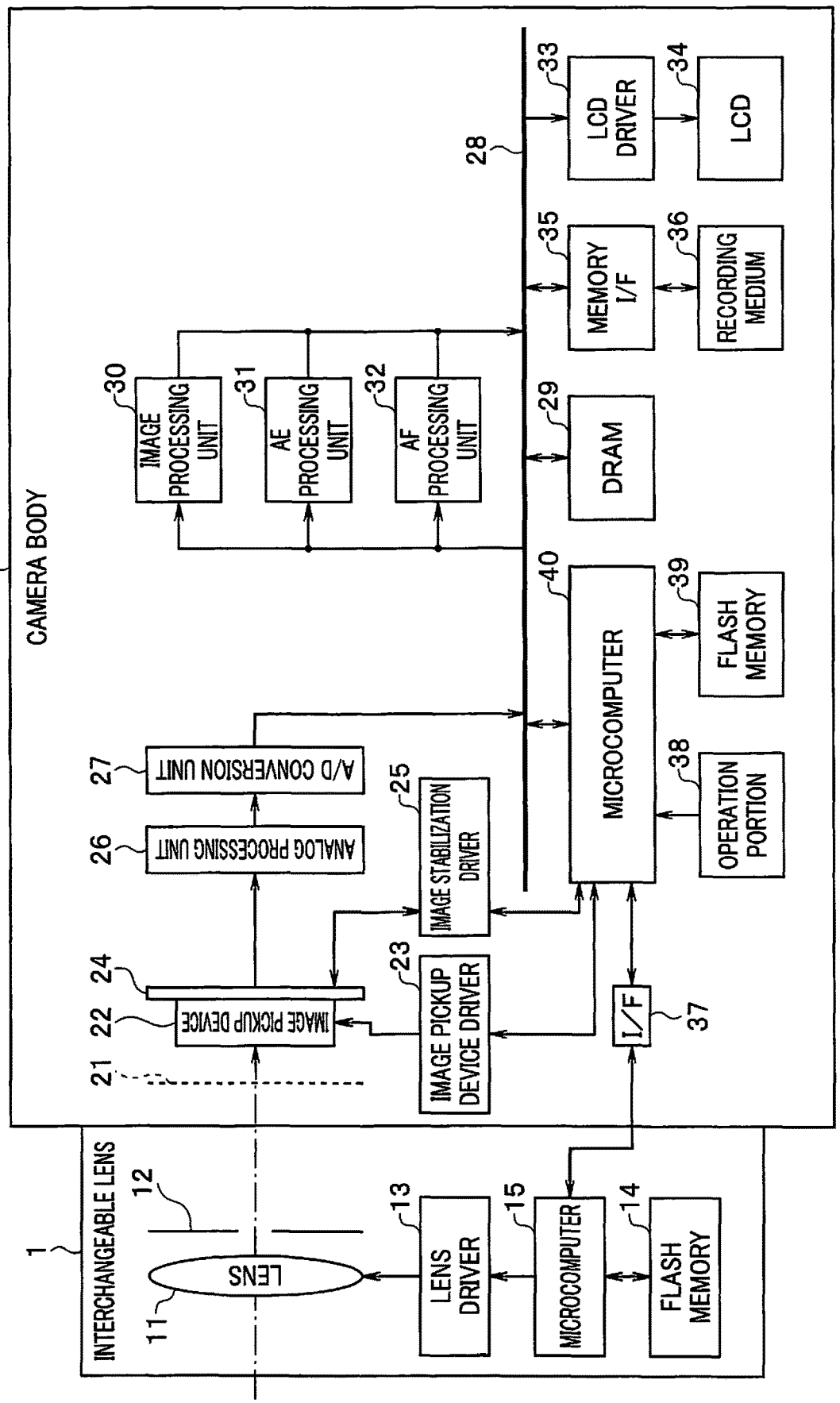
FIG. 1 is a block diagram showing a configuration of an image pickup apparatus in an embodiment 1 of the present invention.

FIGS. 1-7 show an embodiment 1 of the present invention, and FIG. 1 is a block diagram showing a configuration of an image pickup apparatus.

Note that although the embodiment will be described taking a digital camera as an example of the image pickup apparatus, no limitation is intended, and any apparatus is applicable as long as the apparatus is provided with an image pickup function. Although a lens interchangeable type is taken as an example of a digital camera, a lens-integrated type is also applicable.

The image pickup apparatus is configured by detachably connecting an interchangeable lens 1 and a camera body 2 using a lens mount or the like.

The interchangeable lens 1 is provided with a lens 11, an aperture 12, a lens driver 13, a flash memory 14, and a microcomputer 15.

The lens 11 is configured as, for example, a photographing optical system including one or more optical lenses, and is a lens unit configured to form an optical image of an object (object image) on an image pickup device 22 described later of the camera body 2.

The aperture 12 is an optical aperture configured to control a passing range of luminous flux from the lens 11 toward the image pickup device 22.

The lens driver 13 drives the lens 11 based on an instruction from the microcomputer 15 to adjust a focus position. In addition, the lens driver 13 drives the aperture 12 based on an instruction from the microcomputer 15 to change an opening diameter. The driving of the aperture 12 changes brightness of the optical image of the object, and also changes the size of a blur.

The flash memory 14 is a recording medium configured to record a control program executed by the microcomputer 15, and various types of information on the interchangeable lens 1.

The microcomputer 15 is a so-called lens-side computer, and is connected to the lens driver 13, the flash memory 14, and an interface (I/F) 37 described later. The microcomputer 15 communicates with a microcomputer 40 described later which is a body-side computer via the interface 37, and receives an instruction from the microcomputer 40 to read/write information recorded in the flash memory 14 and control the lens driver 13. Furthermore, the microcomputer 15 transmits the various types of information on the interchangeable lens 1 to the microcomputer 40.

Next, the camera body 2 is provided with a mechanical shutter 21, the image pickup device 22, an image pickup device driver 23, an image stabilization unit 24, an image stabilization driver 25, an analog processing unit 26, an analog/digital conversion unit (A/D conversion unit) 27, a bus 28, a DRAM (dynamic random access memory) 29, an image processing unit 30, an AE (auto exposure) processing unit 31, an AF (autofocus) processing unit 32, an LCD (liquid crystal display) driver 33, an LCD 34, a memory interface (memory I/F) 35, a recording medium 36, the interface (I/F) 37, an operation portion 38, a flash memory 39, and the microcomputer 40.

The mechanical shutter 21 is for controlling a time period for luminous flux from the lens 11 to reach the image pickup device 22, and is, for example, an optical shutter with a configuration to run a shutter curtain. The mechanical shutter 21 is driven by an instruction from the microcomputer 40 in still image photographing or the like to control a time period for luminous flux to reach the image pickup device 22, that is, a time period for exposure of the object by the image pickup device 22. On the other hand, the mechanical shutter 21 is maintained in an open state during video photographing or live view, and each frame image is acquired by a so-called electronic shutter of the image pickup device 22. However, an electronic shutter may of course be used in still image photographing.

The image pickup device 22 is an image pickup unit (image pickup sensor) having a pixel unit in which a plurality of pixels are two-dimensionally arrayed at a predetermined pixel pitch, and configured to expose the object image using the plurality of pixels to generate an electrical image. That is to say, the image pickup device 22 photo-electrically converts the optical image of the object (object image) formed by the lens 11 and the aperture 12 based on control by the microcomputer 40 which is an image pickup control unit (image pickup control circuit) to generate an analog image signal.

The image pickup device 22 in the embodiment is configured as a color image pickup device, and includes a plurality of types of pixels with color filters of different colors. Specifically, the types of pixels include three types, that is, a G (green) pixel in which a G filter is arranged, an R (red) pixel in which an R filter is arranged, and a B (blue) pixel in which a B filter is arranged. Furthermore, G pixels are classified into two types, that is, a Gr pixel arranged on the same line as an R pixel, and a Gb pixel arranged on the same line as a B pixel.

More specifically, the image pickup device 22 is configured as an image pickup device in a primary color Bayer array in which color filters are arrayed in a mosaic manner.

Here, as publicly known, a primary color Bayer array has (2, 2) pixels as a basic array of a plurality of types of pixels, and has a configuration in which G pixels are arranged at diagonal positions of the basic array, and an R pixel and a B pixel are respectively arranged at remaining diagonal positions. At the time, a G pixel arranged on the same line as an R pixel is a Gr pixel, and a G pixel arranged on the same line as a B pixel is a Gb pixel as described above.

The image pickup device 22 is configured by periodically repeating the basic array of (2, 2) pixels in a two-dimensional direction.

Note that the pixel array of the image pickup device 22 is not limited to a Bayer array, but may be any other pixel array. Accordingly, the basic array is also not limited to (2, 2) pixels.

The image pickup device driver 23 is for driving the image pickup device 22 based on an instruction from the microcomputer 40 to cause the image pickup device 22 to pick up an image.

The image stabilization unit 24 is an image stabilization circuit configured to relatively shift positions of the object image and the image pickup device 22 in a direction perpendicular to the optical axis of the lens 11 within a predetermined movable range. The image stabilization unit 24 shown in FIG. 1 is adapted to shift the image pickup device 22 to relatively shift the positions of the object image and the image pickup device 22 to suppress an image blur. However, limitation to the configuration is not intended, and an image stabilization unit 24 is possible which is configured to move at least part of the lens 11 to stabilize an image, or an image stabilization unit 24 is possible which is provided with both a configuration for shifting the image pickup device 22 and a configuration for moving at least part of the lens 11.

Specifically, the image stabilization unit 24 includes, for example, a hall element and a voice coil motor, and is adapted to float in the air the image pickup unit including the image pickup device 22 with magnetic force of the voice coil motor, and control the magnetic force while detecting the position with the hall element to move the position. However, the image stabilization unit 24 is not limited to a configuration using a voice coil motor and a hall element, but may adopt an appropriate configuration using another drive source and another position detection unit.

The image stabilization driver 25 is an image stabilization control unit (image stabilization control circuit) configured to control the image stabilization unit 24 to perform image stabilization for reducing movement of the object image formed on the image pickup device 22, as well as performing pixel shifting for generating a high-resolution image. The image stabilization driver 25 receives feedback of a control state of the image stabilization unit 24 and controls the image stabilization unit 24 based on a control instruction from the microcomputer 40.

Here, pixel shifting is processing of shifting a relative position between the object image and the image pickup device 22 in a unit of 0.5 pixel pitches or the like (or a unit of 0.3 pixel pitches, or even a unit of other pixel pitches is possible) when a pixel shift super resolution photographing mode is set.

The microcomputer 40 is adapted to generate a control instruction for controlling the image stabilization driver 25 based on, for example, an output of a blur amount detection sensor not shown or the like for detecting a blur amount of a camera shake or the like occurring in the image pickup apparatus. The image stabilization driver 25 performs image stabilization by controlling the image stabilization unit 24 to shift the image pickup device 22 so as to cancel a detected image blur (that is to say, by a shift amount corresponding to a magnitude of the detected image blur in a direction opposite to the detected image blur direction) based on a control instruction from the microcomputer 40.

Furthermore, the image stabilization driver 25 is adapted to function as a pixel shift adjustment unit (pixel shift adjustment circuit) configured to set a pixel shift adjustment amount according to the control state of the image stabilization unit 24, and adjust pixel shifting based on the pixel shift adjustment amount. That is to say, the image stabilization driver 25 is adapted to set the pixel shift adjustment amount, as described later, according to an image stabilization amount (one of amounts indicating the control state of the image stabilization unit 24) fed back from the image stabilization unit 24, and adjust pixel shifting.

Note that although a configuration example is described here in which the image stabilization driver 25 functions as the pixel shift adjustment unit (pixel shift adjustment circuit), no limitation is intended, and a configuration is possible in which the microcomputer 40 or the like functions as the pixel shift adjustment unit (pixel shift adjustment circuit). In the case, the microcomputer 40 calculates the pixel shift adjustment amount, and transmits a pixel shift adjustment instruction based on the calculation result to the image stabilization driver 25. Alternatively, the pixel shift adjustment unit (pixel shift adjustment circuit) may be provided independently from the image stabilization driver 25 and the microcomputer 40.

The analog processing unit 26 performs waveform shaping on the analog image signal read from the image pickup device 22 after reducing reset noise or the like, and further performs gain-up so as to achieve a desired brightness.

The A/D conversion unit 27 converts the analog image signal outputted from the analog processing unit 26 into a digital image signal (RAW image data).

The bus 28 is a transfer path for transferring various types of data and control signals generated at a certain location in the image pickup apparatus to another location in the image pickup apparatus. The bus 28 in the embodiment is connected to the A/D conversion unit 27, the DRAM 29, the image processing unit 30, the AE processing unit 31, the AF processing unit 32, the LCD driver 33, the memory I/F 35, and the microcomputer 40.

The RAW image data outputted from the A/D conversion unit 27 is transferred through the bus 28 and temporarily stored in the DRAM 29.

The DRAM 29 is a storage unit configured to temporarily store various types of data such as the RAW image data described above, and image data processed in the image processing unit 30 or the like.

The image processing unit 30 is for performing various types of image processing such as OB subtraction, white balance (WB) gain, demosaicking, noise reduction, color conversion, gamma conversion, and scaling on the RAW image data inputted through the bus 28. Note that data compression/data decompression in recording/reading a still image or video in/from the recording medium 36 may be performed by the image processing unit 30, or may be performed by providing a dedicated compression/decompression unit.

Furthermore, the image processing unit 30 is adapted to function as a high-resolution image composition unit configured to compose a high-resolution image based on a plurality of image data obtained while performing pixel shifting when the pixel shift super resolution photographing mode is set in the image pickup apparatus. Here, a high-resolution image is an image with a higher resolution than an image of one frame obtained from the image pickup device 22. Note that although an example is taken here in which the image processing unit 30 functions as the high-resolution image composition unit, no limitation is intended, and the microcomputer 40 or the like may function as the high-resolution image composition unit, or another processor not shown may be configured to function as the high-resolution image composition unit.

The AE processing unit 31 extracts a luminance component from the RAW image data inputted through the bus 28, and calculates a proper exposure condition (respective values such as Tv, Av, and Sv which give proper exposure) based on the extracted luminance component. The proper exposure condition calculated here is used for automatic exposure (AE) control, and specifically, control of the aperture 12 based on the Av value, control of the mechanical shutter 21 based on the Tv value or exposure timing control (control of a so-called electronic shutter) of the image pickup device 22 based on the Tv value, and gain control of the analog processing unit 26 based on the Sv value (alternatively, digital gain control of the image processing unit 30 or the like) are performed.

The AF processing unit 32 extracts a signal of a high-frequency component from the RAW image data inputted through the bus 28, and acquires a focus evaluation value using AF (autofocus) integration processing. The focus evaluation value acquired here is used for AF driving of the lens 11. Note that AF is of course not limited to such contrast AF, and a configuration is possible such that a dedicated AF sensor or the like (or pixels for AF on the image pickup device 22) may be used to perform phase difference AF.

The LCD driver 33 is a display apparatus driving unit, reads image data stored in the DRAM 29 after image processing is performed by the image processing unit 30, converts the read image data into a video signal, and controls driving of the LCD 34 to cause the LCD 34 to display an image based on the video signal.

The LCD 34 is a display apparatus, and displays an image, as well as displaying various types of information on the image pickup apparatus based on driving control by the LCD driver 33 as described above.

The memory I/F 35 is a recording control unit configured to perform control for recording image data in the recording medium 36, and also reads the image data from the recording medium 36.

The recording medium 36 is a recording unit configured to record image data in a non-volatile manner, and is configured with a memory card or the like attachable/detachable to/from the camera body 2. However, the recording medium 36 is not limited to a memory card, but may be a disc-like recording medium or any other recording medium. The recording medium 36 may be of a type built in the camera body 2. Thus, although the recording medium 36 may have a configuration unique to the image pickup apparatus, non-unique configurations are also possible.

The interface 37 connects the microcomputer 15 of the interchangeable lens 1 and the microcomputer 40 of the camera body 2 in a bidirectionally communicable manner.

The operation portion 38 is for performing various types of operation input to the image pickup apparatus, and includes a power button for powering on/off the image pickup apparatus, a release button formed of, for example, a two-step operation button configured by having a 1st release switch and a 2nd release switch for providing an instruction to start photographing of an image, a reproduction button for reproducing a recorded image, a menu button for making settings or the like of the image pickup apparatus, and operation buttons such as a cross key used for a selection operation of an item and an OK button used for a determining operation of a selected item.

Here, items which can be set using the menu button, the cross key, the OK button, and the like include photographing modes (a still image photographing mode, the pixel shift super resolution photographing mode, a video photographing mode, and the like), a recording mode, a reproduction mode, on/off of an image stabilization function, and the like. When the operation portion 38 is operated, a signal corresponding to an operation content is outputted to the microcomputer 40.

The flash memory 39 is a non-transitory computer-readable recording medium configured to record in a non-volatile manner a computer program (including an image pickup program for picking up an image) executed by the microcomputer 40, and various types of information on the image pickup apparatus. Here, information recorded in the flash memory 39 includes, for example, a model name and a serial number for identifying the image pickup apparatus, parameters used for image processing, and setting values set by a user. Furthermore, pixel shift order, and a pixel shift direction and a pixel shift amount according to the pixel shift order are recorded in the flash memory 39. The information recorded in the flash memory 39 is read by the microcomputer 40.

The microcomputer 40 is for controlling each unit in the camera body 2, as well as controlling the interchangeable lens 1 by transmitting an instruction to the microcomputer 15 via the interface 37, and is a control unit configured to perform overall control of the image pickup apparatus. The microcomputer 40 analyzes inputted information when operation input is performed by a user from the operation portion 38, and reads parameters necessary for processing from the flash memory 39 according to the computer program recorded in the flash memory 39 to perform various types of arithmetic processing and the like, while executing various sequences corresponding to operation contents.

The microcomputer 40 uses the microcomputer 15 and the lens driver 13 to control the aperture 12 based on the Av value calculated by the AE processing unit 31 through the lens driver 13, as well as performing gain control of the analog processing unit 26 (or digital gain control of the image processing unit 30) based on the Sv value calculated by the AE processing unit 31.

Furthermore, the microcomputer 40 controls the mechanical shutter 21 (or the electronic shutter described above) based on the Tv value calculated by the AE processing unit 31 in still image photographing or pixel shift super resolution photographing.

When the image stabilization function is set to be turned on and the pixel shift super resolution photographing mode is set in the image pickup apparatus, the image stabilization unit 24 performs image stabilization and pixel shifting.

In such a case, in order to contrast with operation of the embodiment described later, operation in the case of turning off the function of the pixel shift adjustment unit (pixel shift adjustment circuit) will be described first. Note that although actual operation of the image stabilization unit 24 is performed in the two-dimensional direction, operation in the case of setting one direction in the two-dimensional pixel array (either one of the horizontal direction and the vertical direction) as a direction of interest will be described here for simplicity of description.

Figure 2:
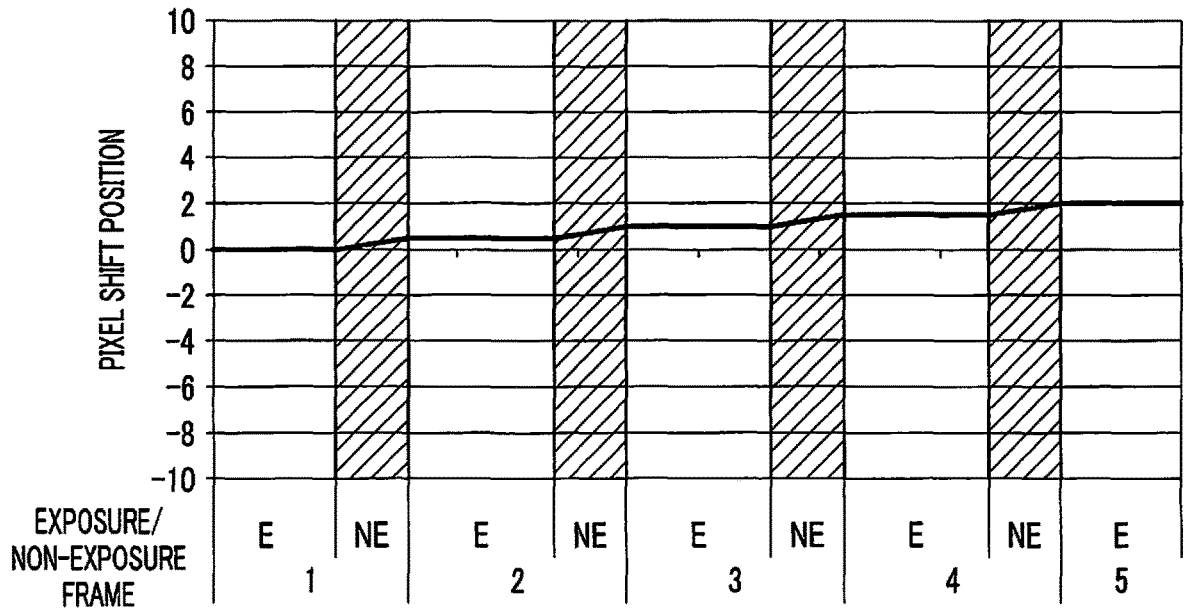
FIG. 2 is a timing chart showing an example of a pixel shift position when pixel shift adjustment is not performed in the above embodiment 1.

FIG. 2 is a timing chart showing an example of a pixel shift position when pixel shift adjustment is not performed. In FIG. 2 (and FIGS. 3-5, 8 described later), a vertical axis represents a position driven by the image stabilization unit 24, and a horizontal axis represents a time axis on which a right direction is a time progressing direction. A scale of the vertical axis represents a pixel pitch in the direction of interest.

In the pixel shift super resolution photographing mode, a plurality of images are picked up and acquired based on a continuous photographing sequence while pixel shifting is performed by, for example, 0.5 pixel pitches each time. Continuous photographing is performed by repeating exposure of an image and reading of the exposed image. A time period for exposing an image is an exposure period E, and a time period between two consecutive exposure periods E is a non-exposure period NE (shown with hatching in FIG. 2, etc.). A non-exposure period NE includes a time period for reading an image. One frame period is composed of an exposure period E and a non-exposure period NE immediately after the exposure period E.

Explanation will be provided below assuming that an initial position of the image stabilization unit 24 is 0, and a movable range in the direction of interest is from −10 pixel pitches to +10 pixel pitches.

First, FIG. 2 shows only predetermined pixel shift positions. The image stabilization unit 24 performs pixel shifting for relatively shifting the positions of the object image and the image pickup device 22 only in the non-exposure period NE. Accordingly, the pixel shift position after shifting is maintained in the exposure period E, and shifting related to pixel shifting is not performed. The purpose is to prevent the object image during exposure from being blurred.

The example shown in FIG. 2 shows a case where the pixel shift position of a first frame of continuous photographing is set to the initial position of 0, and pixel shifting is performed by 0.5 pixel pitches each time in the positive direction in the non-exposure period NE. Note that FIG. 2 shows as an example the exposure period E of the first frame through the exposure period E of a fifth frame. Pixel shifting as shown in FIG. 2 is regarded as reference pixel shifting before pixel shift adjustment.

Figure 3:
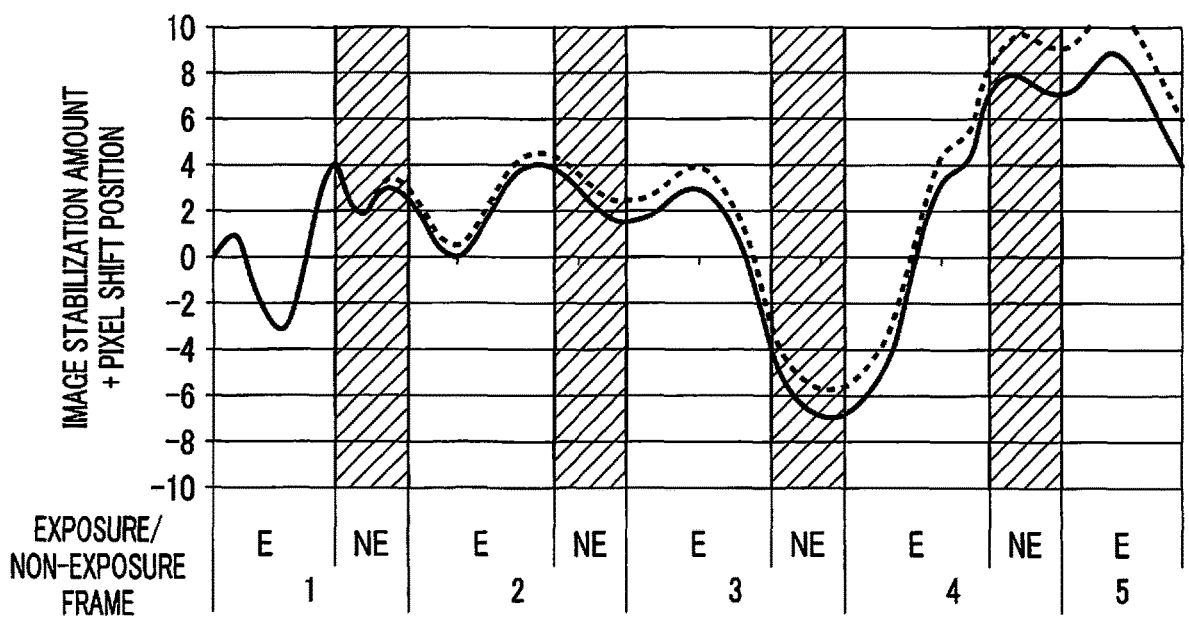
FIG. 3 is a timing chart showing a shift position of an image stabilization unit when pixel shifting without pixel shift adjustment is performed together with image stabilization in the above embodiment 1.

FIG. 3 is a timing chart showing a shift position of the image stabilization unit 24 when pixel shifting without pixel shift adjustment is performed together with image stabilization.

A solid line in FIG. 3 shows image stabilization that the image stabilization driver 25 causes the image stabilization unit 24 to perform. Image stabilization starts from the initial position of 0, and is adaptively performed both in the positive and negative directions according to an image blur amount occurring in the image pickup apparatus so as to cancel the image blur amount.

A dashed line in FIG. 3 shows a shift position of the image stabilization unit 24 in performing pixel shifting as shown in FIG. 2 in addition to image stabilization (which is a relative shift position between the object image and the image pickup device 22, and is a shift position of the image pickup device 22 by the image stabilization unit 24 in the embodiment).

Accordingly, the position shown by the dashed line in FIG. 3 is a shift position obtained by adding the shift position shown by the solid line in FIG. 3 and the pixel shift amount shown in FIG. 2. Since the pixel shift amount shown in FIG. 2 is an amount which increases in the positive direction each time the frame advances, a deviation amount of the dashed line from the solid line in FIG. 3 increases each time the frame advances.

Since the pixel shift amount is positive except in the first frame, a negative image stabilization amount will move the shift position in the direction to the initial position of 0 as viewed from a range end on the negative side of the movable range (−10 pixel pitches), but a positive image stabilization amount causes the shift position to get away from the initial position of 0 to approach a range end on the positive side of the movable range (+10 pixel pitches), thus ending up a small margin value which is a margin amount of correction.

In the example shown in FIG. 3, the shift position has exceeded the range end of the movable range (+10 pixel pitches) during the exposure period E of the fifth frame. Accordingly, the image pickup unit or the like abuts on the range ends of the movable range by the image stabilization unit 24 to generate a time period in which image stabilization is not correctly performed, so that an image acquired in the fifth frame ends up an image containing an image blur during exposure. When a high-resolution image is generated from images of a plurality of frames including such an image in which an image blur is generated, aimed resolution feeling can not be obtained, resulting in the need for re-photographing or the like.

Therefore, the image pickup apparatus in the embodiment is adapted to operate with the function of the pixel shift adjustment unit (pixel shift adjustment circuit) being turned on.

Figure 4:
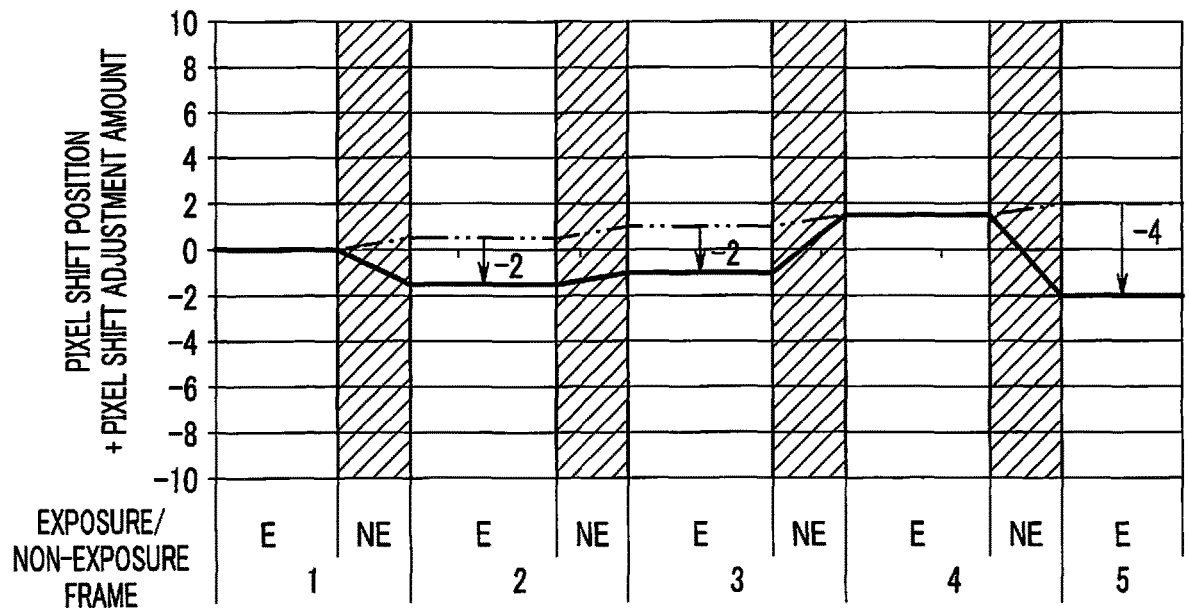
FIG. 4 is a timing chart showing an example of the pixel shift position when pixel shift adjustment is performed in the above embodiment 1.
Figure 5:
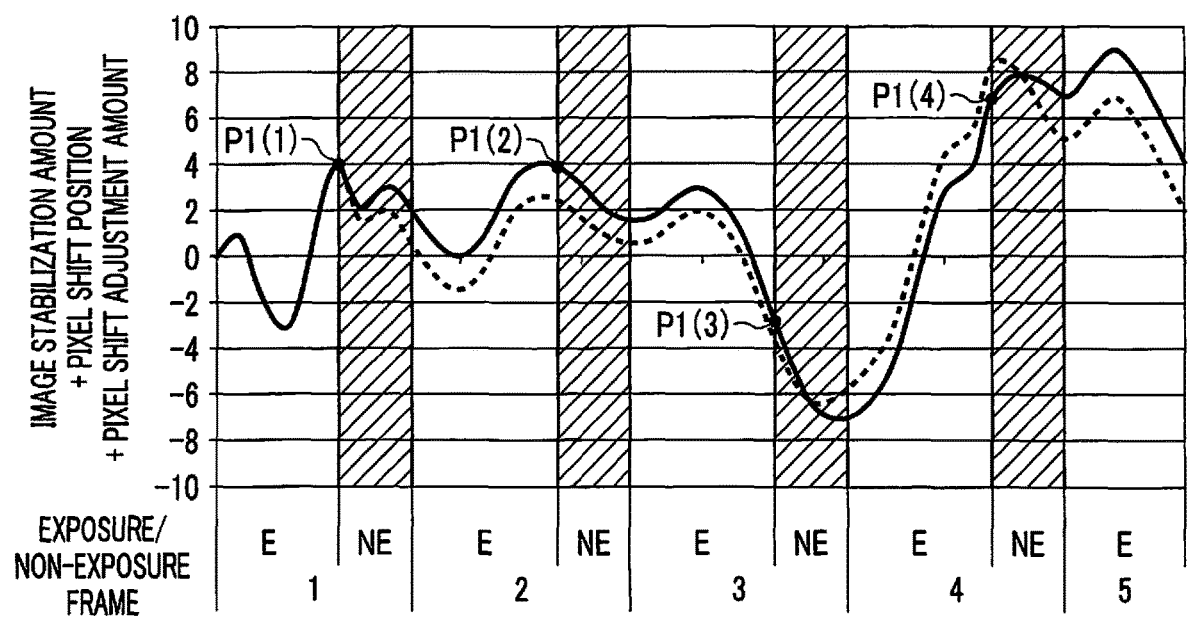
FIG. 5 is a timing chart showing a shift position of the image stabilization unit when pixel shifting with pixel shift adjustment is performed together with image stabilization in the above embodiment 1.

FIG. 4 is a timing chart showing an example of a pixel shift position when pixel shift adjustment is performed, and FIG. 5 is a timing chart showing a shift position of the image stabilization unit 24 when pixel shifting with pixel shift adjustment is performed together with image stabilization.

As described above, pixels are periodically arrayed in the pixel unit of the image pickup device 22, and the embodiment employs a primary color Bayer array, and therefore uses an array with a spatial cycle of the basic array of (2, 2) pixels as a basic cycle. Therefore, even when the pixel shift position is shifted by a shift amount in the unit of the basic cycle (a shift amount which is an integer multiple of the basic cycle), an image at an aimed pixel shift position can be obtained by moving a position of cutting out an image by the shifted shift amount.

Therefore, the image stabilization driver 25 (or the microcomputer 40 or the like as described above (the same applies hereinafter)) which functions as the pixel shift adjustment unit (pixel shift adjustment circuit) is adapted to set the pixel shift adjustment amount to an integer multiple of the basic cycle according to the image stabilization amount indicating the control state of the image stabilization unit 24, and adjust pixel shifting based on the set pixel shift adjustment amount.

First, the pixel shift adjustment unit (pixel shift adjustment circuit) sets the positive/negative sign of the pixel shift adjustment amount so that the shift position by the image stabilization unit 24 may approach the initial position of 0 in the movable range of −10 to +10 pixel pitches.

For example, the pixel shift adjustment amount is set to be negative when the image stabilization amount is positive, the pixel shift adjustment amount is set to be positive when the image stabilization amount is negative, the pixel shift adjustment amount is set to 0 when the image stabilization amount is 0 (see FIG. 7 described later), and so on.

However, if the pixel shift adjustment amount is set to −2 pixel pitches when the image stabilization amount is +0.3 pixel pitches, the pixel shift amount after pixel shift adjustment becomes −1.5 pixel pitches when the next pixel shift amount is +0.5 pixel pitches, and the shift position may be closer to the initial position of 0 in some cases when pixel shift adjustment is not performed. In such cases, even when the image stabilization amount is positive, the pixel shift adjustment amount will be set to 0. Accordingly, actual control is performed more adaptively.

Furthermore, the pixel shift adjustment unit (pixel shift adjustment circuit) sets the magnitude of the pixel shift adjustment amount according to the margin value between the shift position by the image stabilization unit 24 at a time point of transition from the exposure period E to the non-exposure period NE and the range ends of the movable range (±10 pixel pitches).

In the example shown in FIG. 5, the image stabilization amount at a time point of transition from the exposure period E to the non-exposure period NE in the n-th frame (n=1-4) is denoted as P1(n).

First, since driving control of the image stabilization unit 24 is started from the initial position of 0, pixel shift adjustment is not performed on the first frame, and the pixel shift adjustment amount is 0.

P1(1) has, for example, a value of +4 pixel pitches (hereinafter, the unit "pixel pitch" will be omitted as appropriate). Accordingly, the margin value to the range end of +10 of the movable range is 6, and the margin value to the range end of −10 of the movable range is 14, so that the smaller margin value is 6. Therefore, the pixel shift adjustment unit (pixel shift adjustment circuit) sets the pixel shift adjustment amount of the next, second frame to −2. Since the pixel shift amount of the second frame is +0.5, the pixel shift amount after pixel shift adjustment is −1.5.

Similarly, for example, P1(2) has a value of +4, P1(3) has a value of −2.8, and P1(4) has a value of +7. Therefore, the pixel shift adjustment unit (pixel shift adjustment circuit) performs pixel shift adjustment as follows, for example.

| frame number | 2 | 3 | 4 | 5 |
|---|---|---|---|---|
| pixel shift amount before pixel shift adjustment | +0.5, | +1.0, | +1.5, | +2.0 |
| pixel shift adjustment amount | −2.0, | −2.0, | 0.0, | −4.0 |
| pixel shift amount after pixel shift adjustment | −1.5, | −1.0, | +1.5, | −2.0 |

Here, since P1(3) is a negative value, the margin value to the range end of −10 of the movable range is smaller than the margin value to the range end of +10 of the movable range. The pixel shift adjustment amount is set to 0, since the margin value (absolute value) to the range end of −10 of the movable range is 7.2, a margin for shifting in the negative direction still exists, and it can be determined that the need for pixel shift adjustment is little.

Since the smaller margin value of P1(4) is 3 while the smaller margin values of P1(1) and P1(2) are 6, the pixel shift adjustment amount is set to −4 in the fifth frame according to the smallness of the margin value.

More generally, in the pixel unit of the image pickup device 22, a plurality of pixels are arrayed in the x and y directions, and a pixel position is represented by (x, y). At the time, although the basic cycle of the Bayer array is represented by (2, 2), the basic cycle is more generally (m, n) (m and n are positive integers).

When the reference pixel shift amount is denoted as (sx, sy), the pixel shift adjustment unit (pixel shift adjustment circuit) adjusts the pixel shift amount after pixel shift adjustment to be (sx+m×z1, sy+n×z2) (z1 and z2 are integers). Here, (m×z1) is a pixel shift adjustment amount in the x direction, and (n×z2) is a pixel shift adjustment amount in the y direction.

At the time, when the movable range in the x direction is more generally set to xmin≤x≤xmax, and the image stabilization amount in the x direction at a time point of transition to the non-exposure period NE is denoted as P1x, the pixel shift adjustment unit (pixel shift adjustment circuit) adjusts z1 so that the following expression 1 or the like may be satisfied.

$$x\min \leq (P1x + sx + m \times z1) \leq x\max \quad \text{[Expression 1]}$$

Furthermore, when the movable range in the y direction is set to ymin≤y≤ymax, and the image stabilization amount in the y direction at a time point of transition to the non-exposure period NE is denoted as P1y, the pixel shift adjustment unit (pixel shift adjustment circuit) adjusts z2 so that the following expression 2 or the like may be satisfied.

$$y\min \leq (P1y + sy + n \times z2) \leq y\max \quad \text{[Expression 2]}$$

Here, the expressions 1 and 2 mean that z1 and z2 are set so that the shift position after pixel shifting may fall within the movable range. Note that a setting of z1=z2 is also possible when z1 satisfying the expression 1 and z2 satisfying the expression 2 have a common value.

Thus, the shift position of the image stabilization unit 24 shown by the dashed line in FIG. 5 has a larger margin value from the range ends (±10) of the movable range than the shift position of the image stabilization unit 24 shown by the dashed line in FIG. 3. For example, although the shift position in the fifth frame in FIG. 3 exceeds the range end of +10 of the movable range (however, the shift position will not exceed +10 in actual control, and the image pickup unit will abut on the range end of +10), the shift position in FIG. 5 has a value below the range end of +10 of the movable range. Thus, it is possible to significantly reduce cases where the image pickup unit abuts on the range ends of the movable range by the image stabilization unit 24, so that the need for re-photographing can be reduced.

Figure 6:
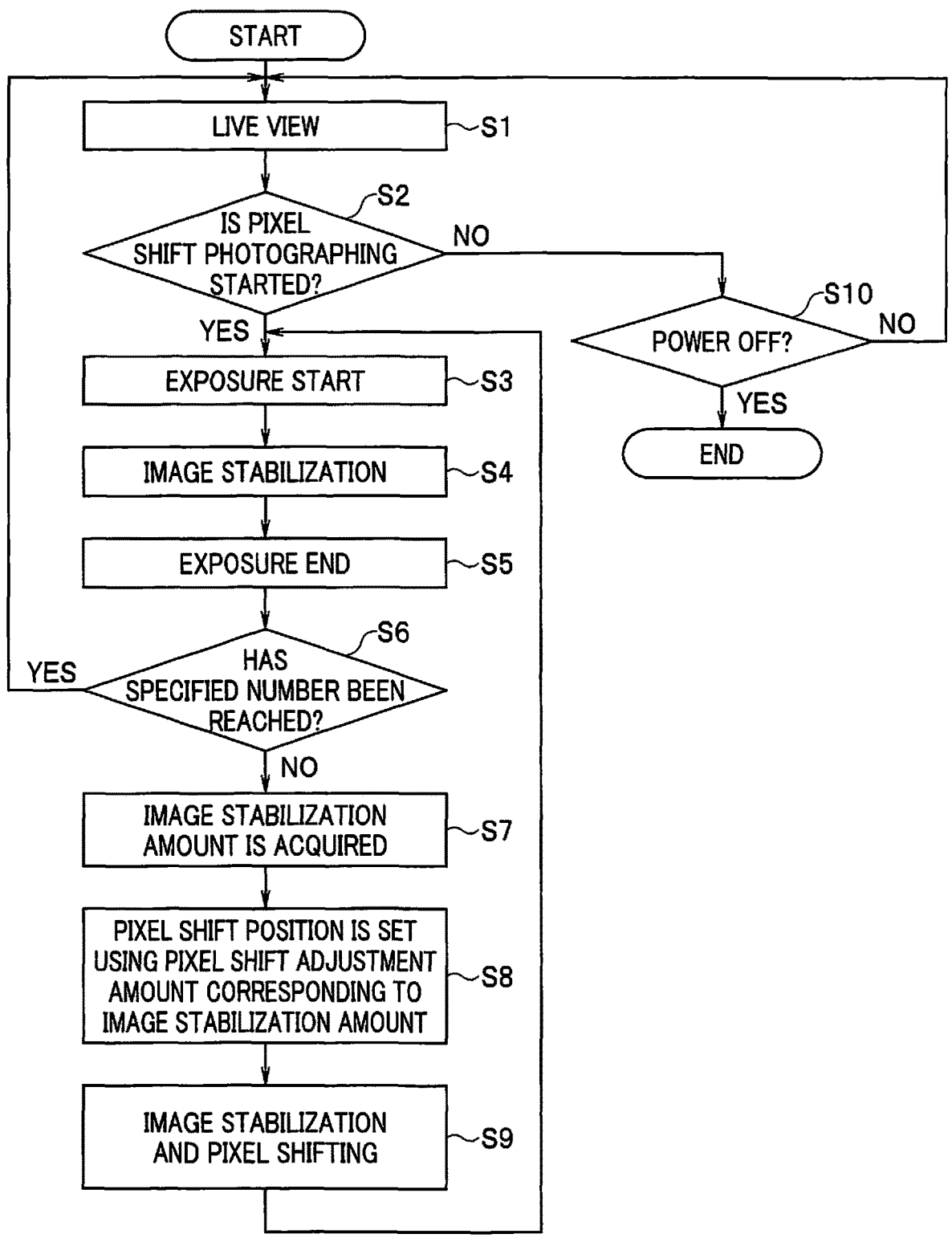
FIG. 6 is a flowchart showing operation of the image pickup apparatus in the above embodiment 1.

FIG. 6 is a flowchart showing operation of the image pickup apparatus. Note that FIG. 6 shows a flow of processing when the image pickup apparatus is set to the pixel shift super resolution photographing mode, and description is omitted about processing when other modes are set.

For example, when the power button of the operation portion 38 is turned on to power on the image pickup apparatus to start processing shown in FIG. 6, live view is performed in which an image is acquired by the image pickup device 22, and image processing for live view is performed by the image processing unit 30 for display on the LCD 34 (step S1).

The microcomputer 40 determines whether the release button of the operation portion 38 has been operated during live view to provide an instruction to start pixel shift photographing (step S2).

Here, when it is determined that an instruction to start pixel shift photographing has been provided, the microcomputer 40 opens the mechanical shutter 21 to start exposure (step S3), as well as transmitting a control instruction to the image stabilization driver 25 to cause the image stabilization unit 24 to perform image stabilization (step S4).

When a predetermined exposure time period has elapsed, the microcomputer 40 closes the mechanical shutter 21 to end exposure (step S5). Note that although a case is here assumed where the mechanical shutter 21 is opened and closed to perform continuous photographing, continuous photographing may be performed using the electronic shutter, with the mechanical shutter 21 kept open.

Next, the microcomputer 40 determines whether photographing of a specified number of images required to compose a high-resolution image has ended (step S6).

When it is determined here that the specified number has not been reached, the image stabilization driver 25 which functions as the pixel shift adjustment unit (pixel shift adjustment circuit) acquires from the image stabilization unit 24 the image stabilization amount P1(n) at a time point of transition from the exposure period E to the non-exposure period NE (step S7).

Subsequently, the image stabilization driver 25 adaptively sets the pixel shift adjustment amount as described above based on the image stabilization amount P1(n) acquired in step S7, and uses the pixel shift adjustment amount to perform pixel shift adjustment on the pixel shift amount (step S8).

Figure 7:
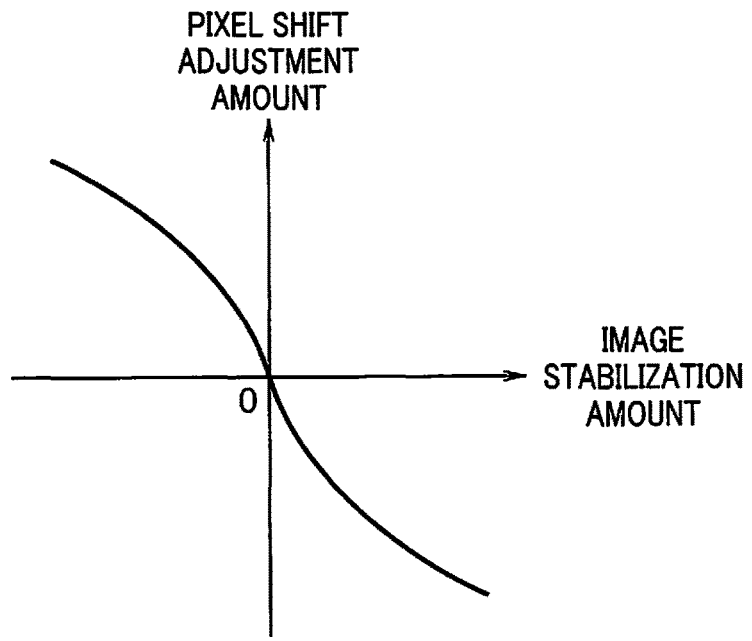
FIG. 7 is a diagram conceptually showing a correspondence relationship between an image stabilization amount and a pixel shift adjustment amount in the above embodiment 1.

Here, FIG. 7 is a diagram conceptually showing a correspondence relationship between an image stabilization amount and a pixel shift adjustment amount.

FIG. 7 shows a tendency that the pixel shift adjustment amount is set to be negative when the image stabilization amount is positive, and the pixel shift adjustment amount is set to be positive when the image stabilization amount is negative.

FIG. 7 further shows a tendency that the pixel shift adjustment amount is set to decrease in the negative direction (that is to say, so that the absolute value of the pixel shift adjustment amount may increase) when the image stabilization amount increases on the positive side, and the pixel shift adjustment amount is set to increase in the positive direction when the image stabilization amount decreases on the negative side (that is to say, the absolute value of the image stabilization amount increases).

Based on control by the microcomputer 40, the image stabilization driver 25 performs pixel shifting with pixel shift adjustment as shown by the dashed line in FIG. 5 together with image stabilization in the non-exposure period NE (step S9). In the non-exposure period NE, an image generated in the exposure period E is read.

When the non-exposure period NE has ended, a transition is made to the exposure period E again, and a return is made to step S3 to start exposure.

Thus, the microcomputer 40 causes the image pickup device 22 to continuously pick up a plurality of images while causing the image stabilization driver 25 to control the image stabilization unit 24 to perform image stabilization in the exposure period E, and perform pixel shifting adjusted by the pixel shift adjustment unit (pixel shift adjustment circuit) in the non-exposure period NE.

When it is determined that the specified number has been reached in step S6, the image processing unit 30 composes a high-resolution image based on the acquired plurality of images for display on the LCD 34 and recording in the recording medium 36, and a return is then made to step S1 to perform live view in preparation for photographing of a next image.

On the other hand, when it is determined that an instruction to start pixel shift photographing has not been provided in step S2, the microcomputer 40 determines whether a turn-off operation has been performed on the power button of the operation portion 38 (step S10).

Here, when it is determined that a turn-off operation has not been performed on the power button, a return is made to step S1 to continue live view.

On the other hand, when it is determined that a turn-off operation has been performed on the power button in step S10, the processing is ended.

Note that the pixel shift adjustment amount is set above in the unit of the basic cycle of the pixel array in the pixel unit of the image pickup device 22. In contrast, various techniques have recently been proposed for generating a high-resolution image based on an image with any pixel shift amount (e.g., an image on which pixel shifting is not performed in a unit of 0.5 pixel pitches), and new algorithms are being developed. Accordingly, when such techniques are used, it is not necessary to perform pixel shift adjustment with a pixel shift adjustment amount which is an integer multiple of the basic cycle of the pixel unit, and it is possible to perform pixel shift adjustment with any pixel shift adjustment amount. Therefore, for example, as shown in FIG. 7, the pixel shift adjustment amount may be continuously varied according to the image stabilization amount.

Although the image stabilization amount P1(n) as shown in FIG. 5 is used above as the shift position by the image stabilization unit 24 at a time point of transition from the exposure period E to the non-exposure period NE (the pixel shift adjustment amount is set based on the shift position), it is instead possible to use a value obtained by adding the reference pixel shift amount as shown in FIG. 2 to the image stabilization amount P1(n) (which is a value shown by the dashed line in FIG. 3 at a time point of transition from the exposure period E to the non-exposure period NE, and is one of amounts indicating the control state of the image stabilization unit 24).

Furthermore, although pixel shifting and image stabilization are performed above in the non-exposure period NE, a blur during exposure will not occur in a generated image even when image stabilization is not performed because an image is not exposed during the non-exposure period NE. Accordingly, image stabilization in the non-exposure period NE may be omitted.

According to the foregoing embodiment 1, when pixel shifting for generating a high-resolution image is performed in an image pickup apparatus configured to perform image stabilization, the pixel shift adjustment amount is set according to the control state of the image stabilization unit 24, and pixel shifting is adjusted based on the pixel shift adjustment amount, so that it is possible to reduce cases where the image pickup unit or the like abuts on the range ends of the movable range by the image stabilization unit 24, thus enabling reduction of the need for re-photographing.

Since the positive/negative sign of the pixel shift adjustment amount is set so that the shift position by the image stabilization unit 24 may approach the initial position of 0 in the movable range, it is possible to effectively reduce cases where the image pickup unit or the like abuts on the range ends of the movable range by the image stabilization unit 24, so that the need for re-photographing can be effectively reduced.

At the time, since the magnitude of the pixel shift adjustment amount is further set according to the margin value between the shift position and the range end of the movable range, it is possible to more significantly reduce cases where the image pickup unit or the like abuts on the range ends of the movable range by the image stabilization unit 24. It is also possible to prevent the pixel shift adjustment amount from unnecessarily increasing.

Since the pixel shift adjustment unit (pixel shift adjustment circuit) sets the pixel shift adjustment amount to an integer multiple of the basic cycle which is the cycle of the basic array, an image with the reference pixel shift amount can be obtained only by adjusting a cutout position of an image. Accordingly, conventionally used algorithms can be used to compose a high-resolution image.

In addition, since image stabilization is performed together with pixel shifting in the non-exposure period NE, image stabilization will not be suddenly turned off when a transition is made from the exposure period E to the non-exposure period NE. Accordingly, it is possible to prevent a sudden change in acceleration of the image pickup unit or the like driven by the image stabilization unit 24.

Embodiment 2

Figure 8:
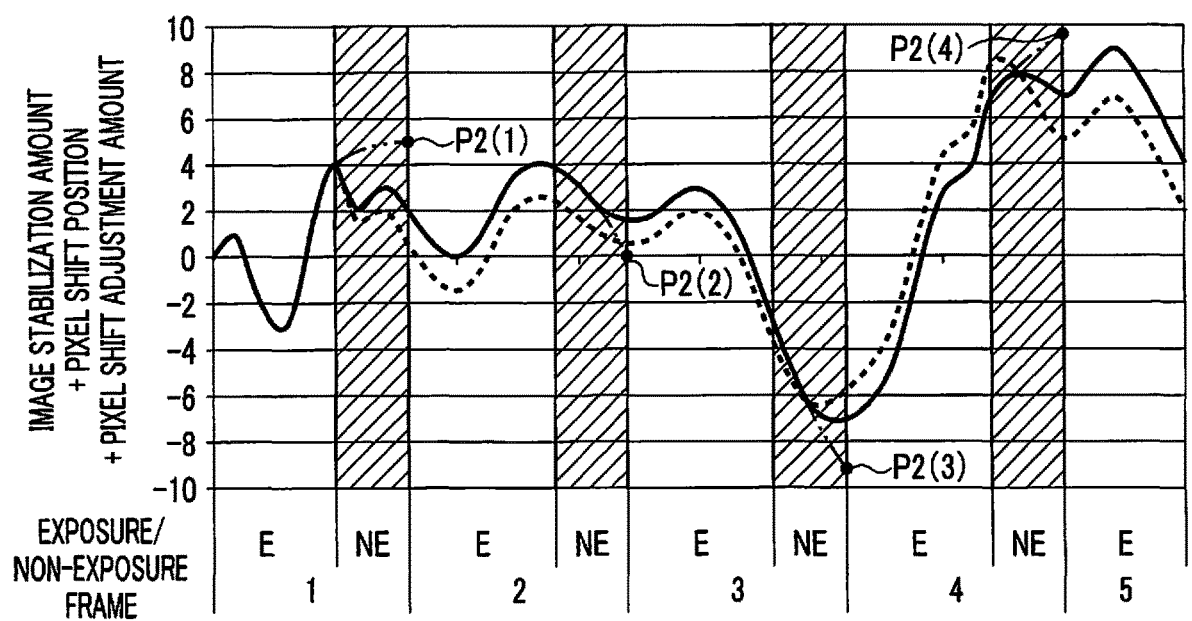
FIG. 8 is a timing chart showing how a predicted image stabilization amount in making a transition from a non-exposure period to an exposure period of a next frame is estimated according to a control state of the image stabilization unit in an embodiment 2 of the present invention.
Figure 9:
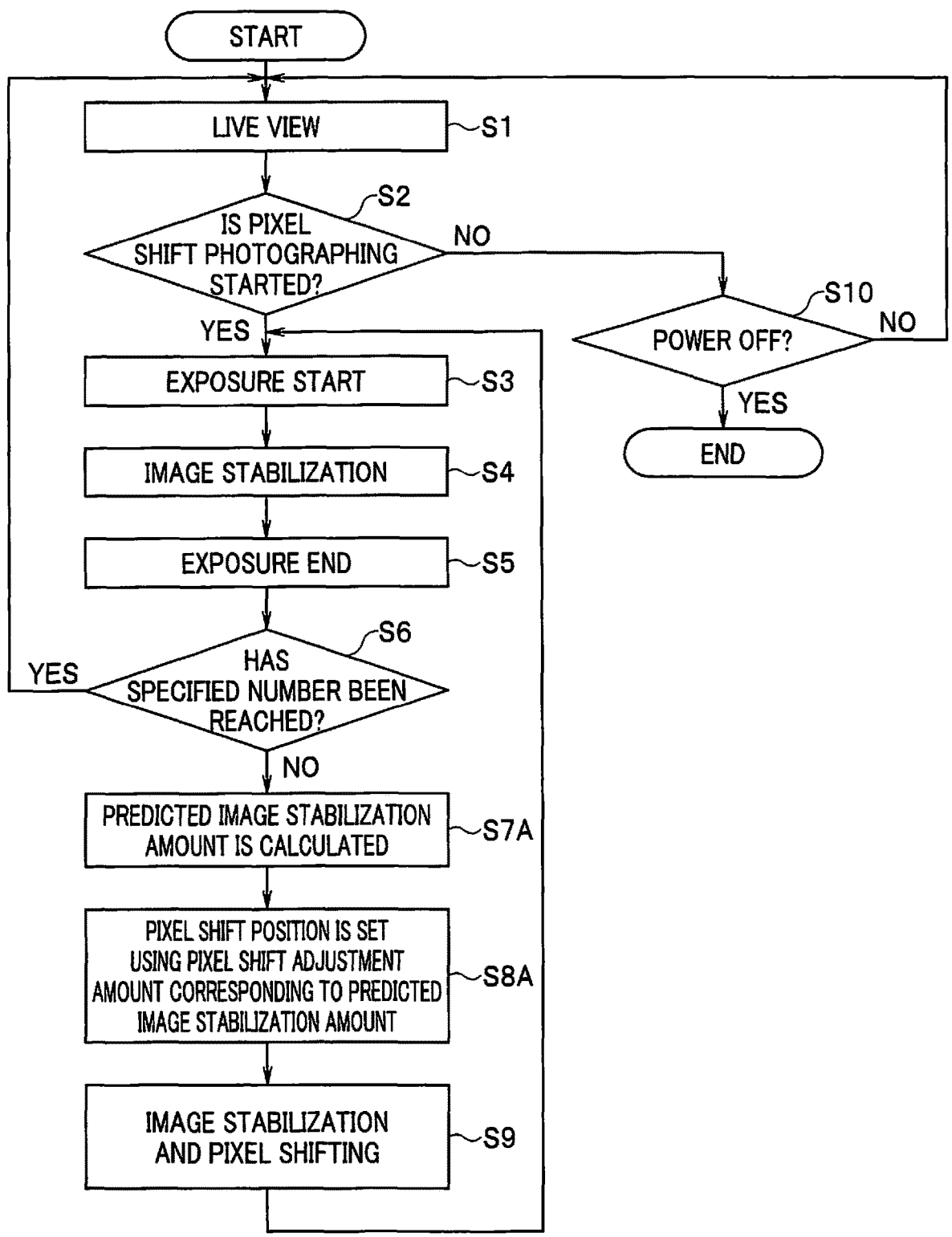
FIG. 9 is a flowchart showing operation of the image pickup apparatus in the above embodiment 2.

FIGS. 8 and 9 show an embodiment 2 of the present invention, and FIG. 8 is a timing chart showing how a predicted image stabilization amount in making a transition from a non-exposure period NE to an exposure period E of a next frame is estimated according to the control state of the image stabilization unit 24.

In the embodiment 2, description of the same parts as the above embodiment 1 will be omitted as appropriate by, for example, giving the same reference numerals, and only different points will be mainly described.

Although the above embodiment 1 sets the pixel shift adjustment amount based on the shift position at a time point of transition from the exposure period E to the non-exposure period NE (e.g., the image stabilization amount P1(n)), the embodiment is adapted to predict a shift position at a time point of transition from the non-exposure period NE to the next exposure period E as a predicted shift position, and set the pixel shift adjustment amount based on the predicted shift position.

That is to say, as shown in FIG. 8, the image stabilization driver 25 (or the microcomputer 40 or the like as described above (the same applies hereinafter)) which functions as the pixel shift adjustment unit (pixel shift adjustment circuit) estimates the predicted shift position at a time point of transition from the non-exposure period NE to the next exposure period E according to the control state of the image stabilization unit 24 at a time point of transition from the exposure period E to the non-exposure period NE.

Specific processing will be described with reference to FIG. 9. Here, FIG. 9 is a flowchart showing operation of the image pickup apparatus.

When the processing shown in FIG. 9 is started, the processing of steps S1-S6 described above is performed.

Then, when it is determined that the specified number has not been reached in step S6, the image stabilization driver 25 which functions as the pixel shift adjustment unit (pixel shift adjustment circuit) predicts a predicted image stabilization amount P2(n) at a time point of transition from the non-exposure period NE to the next exposure period E based on the image stabilization amount P1(n) of the image stabilization unit 24, a change rate of the image stabilization amount, or even second derivative or the like of the image stabilization amount at a time point of transition from the exposure period E to the non-exposure period NE (which are amounts indicating the control state of the image stabilization unit 24) (step S7A). An appropriate one of various prediction algorithms may be used for the prediction. For example, it is possible to calculate a cycle or amplitude of an image blur to perform prediction in consideration of the cycle or amplitude of the image blur.

Then, the image stabilization driver 25 sets the magnitude of the pixel shift adjustment amount according to the margin value between the predicted shift position calculated in step S7A (the predicted image stabilization amount P2(n)) and the range ends (±10) of the movable range. At the time, when the predicted image stabilization amount in the x direction at a time point of transition from the non-exposure period NE to the next exposure period E is denoted as P2x, and the predicted image stabilization amount in the y direction is denoted as P2y, P1x and P1y in the above expressions 1 and 2 should just be read as P2x and P2y, respectively. The magnitude of the pixel shift adjustment amount is adaptively set according to the margin value similarly to the above embodiment 1. Furthermore, the image stabilization driver 25 uses the pixel shift adjustment amount to perform pixel shift adjustment on the pixel shift amount (step S8A).

An advance is then made to processing of step S9, and when it is determined that a turn-off operation has been performed on the power button in step S10, the processing is ended similarly to the processing shown in FIG. 6 of the above embodiment 1.

Note that although the predicted image stabilization amount P2(n) as shown in FIG. 8 is used above as the predicted shift position by the image stabilization unit 24 at a time point of transition from the non-exposure period NE to the next exposure period E, it is instead possible to use a value obtained by adding the reference pixel shift amount as shown in FIG. 2 (the reference pixel shift amount at a time point of transition from the non-exposure period NE to the next exposure period E) to the predicted image stabilization amount P2(n).

According to the foregoing embodiment 2, almost similar effects to the above embodiment 1 are provided, and since the predicted shift position is estimated to set the magnitude of the pixel shift adjustment amount according to the margin value between the predicted shift position and the range end of the movable range, a prediction algorithm with high accuracy can be used to more effectively reduce cases where the image pickup unit or the like abuts on the range ends of the movable range by the image stabilization unit 24, so that the need for re-photographing can be reduced.

Note that the processing in each unit described above may be performed by one or more processors configured as hardware. For example, each unit may be a processor configured as an electronic circuit, or may be each circuit unit in a processor configured with an integrated circuit such as an FPGA (field programmable gate array). Alternatively, a processor configured with one or more CPUs may read and execute a computer program recorded in a recording medium to execute a function as each unit.

Although an image pickup apparatus has mainly been described above, an image pickup method for performing the same processing as the image pickup apparatus is possible, and a computer program for causing a computer to perform the same processing as the image pickup apparatus, a non-transitory computer-readable recording medium storing the computer program, and the like are possible.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus including:
    an image pickup sensor including a plurality of pixels two-dimensionally arrayed at a predetermined pixel pitch, and configured to expose an object image using the plurality of pixels to generate an electrical image;
    a lens configured to form the object image on the image pickup sensor;
    an image stabilization circuit configured to relatively shift positions of the object image and the image pickup sensor in a direction perpendicular to an optical axis of the lens within a predetermined movable range;
    an image stabilization control circuit configured to control the image stabilization circuit to perform image stabilization for reducing movement of the object image formed on the image pickup sensor, and perform pixel shifting for generating a high-resolution image;

a pixel shift adjustment circuit configured to set a pixel shift adjustment amount according to a control state of the image stabilization circuit, and adjust the pixel shifting based on the pixel shift adjustment amount; and an image pickup control circuit configured to cause the image pickup sensor to continuously pick up a plurality of images while causing the image stabilization control circuit to control the image stabilization circuit to perform the image stabilization in an exposure period and perform the pixel shifting adjusted by the pixel shift adjustment circuit in a non-exposure period.

2. The image pickup apparatus according to claim 1, wherein the pixel shift adjustment circuit sets a positive/negative sign of the pixel shift adjustment amount so that a shift position by the image stabilization circuit approaches an initial position within the movable range.

3. The image pickup apparatus according to claim 2, wherein the pixel shift adjustment circuit further sets magnitude of the pixel shift adjustment amount according to a margin value between the shift position at a time point of transition from the exposure period to the non-exposure period and a range end of the movable range.

4. The image pickup apparatus according to claim 2, wherein the pixel shift adjustment circuit further estimates a predicted shift position at a time point of transition from the non-exposure period to a next exposure period according to a control state of the image stabilization circuit at a time point of transition from the exposure period to the non-exposure period, and sets magnitude of the pixel shift adjustment amount according to a margin value between the predicted shift position and a range end of the movable range.

5. The image pickup apparatus according to claim 1, wherein
the plurality of pixels include a plurality of types of pixels, and the image pickup sensor is configured by periodically repeating a basic array of the plurality of types of pixels in a two-dimensional direction; and
the pixel shift adjustment circuit sets the pixel shift adjustment amount to an integer multiple of a basic cycle which is a cycle of the basic array.

6. The image pickup apparatus according to claim 1, wherein the image pickup control circuit causes the image stabilization control circuit to further perform the image stabilization with the pixel shifting in the non-exposure period.

7. A non-transitory computer-readable recording medium storing a computer program, wherein
the computer program is a program for causing the computer to execute:
an image pickup for exposing an object image formed by a lens using a plurality of pixels of an image pickup sensor including the plurality of pixels two-dimensionally arrayed at a predetermined pixel pitch to generate an electrical image;
an image stabilization for relatively shifting positions of the object image and the image pickup sensor in a direction perpendicular to an optical axis of the lens within a predetermined movable range;
an image stabilization control for performing image stabilization for reducing movement of the object image formed on the image pickup sensor, and performing pixel shifting for generating a high-resolution image;

a pixel shift adjustment for setting a pixel shift adjustment amount according to a control state of the image stabilization, and adjusting the pixel shifting based on the pixel shift adjustment amount; and an image pickup control for causing the image pickup sensor to continuously pick up a plurality of images while performing the image stabilization in an exposure period and performing the pixel shifting adjusted by the pixel shift adjustment in a non-exposure period, by the image stabilization control.

8. The non-transitory computer-readable recording medium storing the computer program according to claim 7, wherein
the computer program is a program for causing the computer to further execute,
setting, by the pixel shift adjustment, a positive/negative sign of the pixel shift adjustment amount so that a shift position by the image stabilization approaches an initial position within the movable range.

9. The non-transitory computer-readable recording medium storing the computer program according to claim 8, wherein
the computer program is a program for causing the computer to further execute,
setting, by the pixel shift adjustment, magnitude of the pixel shift adjustment amount according to a margin value between the shift position at a time point of transition from the exposure period to the non-exposure period and a range end of the movable range.

10. The non-transitory computer-readable recording medium storing the computer program according to claim 8, wherein
the computer program is a program for causing the computer to further execute,
estimating a predicted shift position at a time point of transition from the non-exposure period to a next exposure period according to a control state of the image stabilization at a time point of transition from the exposure period to the non-exposure period, and setting magnitude of the pixel shift adjustment amount according to a margin value between the predicted shift position and a range end of the movable range, by the pixel shift adjustment.

11. The non-transitory computer-readable recording medium storing the computer program according to claim 7, wherein
the computer program is a program for causing the computer to further execute,
setting the pixel shift adjustment amount to an integer multiple of a basic cycle which is a cycle of a basic array, by the pixel shift adjustment,
the basic array being an array of a plurality of types of pixels included in the image pickup sensor as the plurality of pixels, and the basic array being periodically repeated in a two-dimensional direction in the image pickup sensor.

12. The non-transitory computer-readable recording medium storing the computer program according to claim 7, wherein
the computer program is a program for causing the computer to further execute,
causing the image stabilization control to further perform the image stabilization with the pixel shifting in the non-exposure period, by the image pickup control.

13. An image pickup method including:
an image pickup for exposing an object image formed by a lens using a plurality of pixels of an image pickup sensor including the plurality of pixels two-dimensionally arrayed at a predetermined pixel pitch to generate an electrical image;

an image stabilization for relatively shifting positions of the object image and the image pickup sensor in a direction perpendicular to an optical axis of the lens within a predetermined movable range;

an image stabilization control for performing image stabilization for reducing movement of the object image formed on the image pickup sensor, and performing pixel shifting for generating a high-resolution image;

a pixel shift adjustment for setting a pixel shift adjustment amount according to a control state of the image stabilization, and adjusting the pixel shifting based on the pixel shift adjustment amount; and an image pickup control for causing the image pickup sensor to continuously pick up a plurality of images while performing the image stabilization in an exposure period and performing the pixel shifting adjusted by the pixel shift adjustment in a non-exposure period, by the image stabilization control.

14. The image pickup method according to claim 13, wherein the pixel shift adjustment sets a positive/negative sign of the pixel shift adjustment amount so that a shift position by the image stabilization approaches an initial position within the movable range.

15. The image pickup method according to claim 14, wherein the pixel shift adjustment further sets magnitude of the pixel shift adjustment amount according to a margin value between the shift position at a time point of transition from the exposure period to the non-exposure period and a range end of the movable range.

16. The image pickup method according to claim 14, wherein the pixel shift adjustment further estimates a predicted shift position at a time point of transition from the non-exposure period to a next exposure period according to a control state of the image stabilization at a time point of transition from the exposure period to the non-exposure period, and sets magnitude of the pixel shift adjustment amount according to a margin value between the predicted shift position and a range end of the movable range.

17. The image pickup method according to claim 13, wherein
the pixel shift adjustment sets the pixel shift adjustment amount to an integer multiple of a basic cycle which is a cycle of a basic array,
the basic array being an array of a plurality of types of pixels included in the image pickup sensor as the plurality of pixels, and the basic array being periodically repeated in a two-dimensional direction in the image pickup sensor.

18. The image pickup method according to claim 13, wherein the image pickup control causes the image stabilization control to further perform the image stabilization with the pixel shifting in the non-exposure period.

* * * * *